United States Patent
Sun et al.

(10) Patent No.: US 9,546,621 B2
(45) Date of Patent: Jan. 17, 2017

(54) CARBON DIOXIDE RECIRCULATION SYSTEM

(71) Applicant: Tenneco Automotive Operating Company Inc., Lake Forest, IL (US)

(72) Inventors: Yong Sun, Ann Arbor, MI (US); Timothy P. Gardner, Canton, MI (US); Benjamin Shade, Whitmore Lake, MI (US); Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/925,062

(22) Filed: Oct. 28, 2015

(65) Prior Publication Data
US 2016/0146161 A1 May 26, 2016

Related U.S. Application Data

(60) Provisional application No. 62/082,843, filed on Nov. 21, 2014.

(51) Int. Cl.
| | |
|---|---|
| *F02M 26/20* | (2016.01) |
| *F01N 3/021* | (2006.01) |
| *F01N 3/20* | (2006.01) |
| *F02B 37/00* | (2006.01) |
| *F01N 3/08* | (2006.01) |
| *B01D 53/14* | (2006.01) |
| *F01N 3/10* | (2006.01) |

(52) U.S. Cl.
CPC ............... *F02M 26/20* (2016.02); *F01N 3/021* (2013.01); *F01N 3/0857* (2013.01); *F01N 3/106* (2013.01); *F01N 3/20* (2013.01); *F01N 3/2066* (2013.01); *F02B 37/00* (2013.01); *F02M 26/04* (2016.02); *F02M 26/35* (2016.02); *B01D 53/1475* (2013.01); *B01D 2258/0283* (2013.01); *F01N 3/101* (2013.01); *F01N 2570/10* (2013.01)

(58) Field of Classification Search
CPC ........ F02M 26/20; F02M 26/04; F02M 26/35; F01N 3/021; F01N 3/20; F01N 3/057; F01N 2570/10; F02B 37/00
See application file for complete search history.

(56) References Cited

U.S. PATENT DOCUMENTS

| | | | | |
|---|---|---|---|---|
| 4,722,305 | A | * | 2/1988 | Haskell ..................... F01P 11/02 123/41.27 |
| 6,079,373 | A | * | 6/2000 | Kawamura ........... F01N 3/0857 123/3 |

(Continued)

*Primary Examiner* — Patrick Maines
(74) *Attorney, Agent, or Firm* — Harness, Dickey & Pierce, P.L.C.

(57) ABSTRACT

A system may include an engine, an exhaust passage, a carbon dioxide capture system, and a dosing valve. The engine includes a combustion chamber. The exhaust passage receives exhaust gas from the engine. The carbon dioxide capture system receives exhaust gas from the exhaust passage and may include a separation device, a pump and a first tank. The separation device removes carbon dioxide from the exhaust gas. The pump pumps the removed carbon dioxide to the first tank. A second tank may receive and store carbon dioxide from the first tank. The dosing valve may be in fluid communication with and disposed downstream of the second tank. The dosing valve may regulate a flow of carbon dioxide from the second tank to the engine.

10 Claims, 2 Drawing Sheets

(56) References Cited

U.S. PATENT DOCUMENTS

Figure 1:
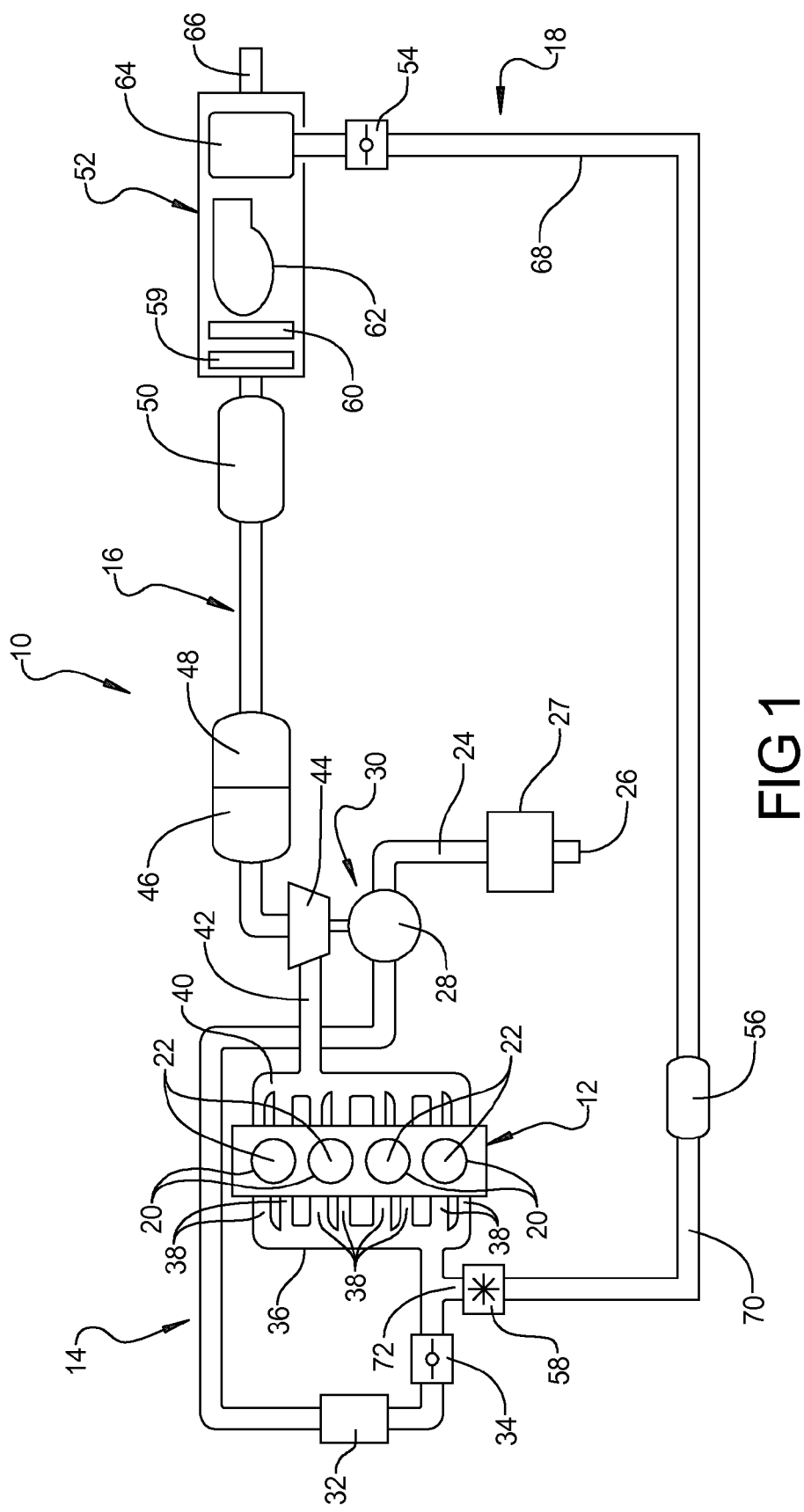

| | | | |
|---|---|---|---|
| 8,480,798 B1* | 7/2013 | Myers | F01N 3/04 55/385.3 |
| 2013/0186075 A1* | 7/2013 | Myers | F01N 5/02 60/320 |
| 2013/0220130 A1* | 8/2013 | Ihms | F01N 5/025 96/329 |
| 2013/0298761 A1* | 11/2013 | Hamad | F01N 3/04 95/11 |
| 2013/0333354 A1* | 12/2013 | Hamad | B01D 53/22 60/274 |
| 2013/0333638 A1* | 12/2013 | Nishida | F02M 21/0227 123/3 |

* cited by examiner

CARBON DIOXIDE RECIRCULATION SYSTEM

CROSS-REFERENCE TO RELATED APPLICATIONS

This application claims the benefit of U.S. Provisional Application No. 62/082,843 filed on Nov. 21, 2014. The entire disclosure of the above application is incorporated herein by reference.

FIELD

The present disclosure relates to a carbon dioxide recirculation system for a combustion engine.

BACKGROUND

This section provides background information related to the present disclosure and is not necessarily prior art.

Many modern combustion engines include an exhaust gas recirculation (EGR) system. Exhaust gas recirculation is an emission control technology allowing significant $NO_x$ emission reductions from diesel engines. EGR is also used in gasoline engines in order to eliminate fuel enrichment at high loads to increase engine efficiency. In both cases, the EGR takes effect by reducing combustion temperature, primarily through dilution effects (lowering the oxygen concentration in the combustion chamber), thermal effects (heat absorption) and chemical effects of $CO_2$ and water in the EGR. The present disclosure uses $CO_2$ separated from exhaust gas and uses it as EGR working fluid. $CO_2$ effects in EGR gas have been illustrated by Ladommatos et al. (Ladommatos, N., S M. Abdelhalim, H. Zhao, Z. Hu, 1996. "The Dilution, Chemical, and Thermal Effects of Exhaust Gas Recirculation on Diesel Engine Emissions—Part 2: Effects of Carbon Dioxide", SAE Technical Paper 961167, doi:10.4271/961167), herein incorporated by reference. In addition, EGR is also used on gasoline engines at part loads to reduce pumping work. $CO_2$ separated from exhaust gas can also be used for that purpose. It can also be used as EGR replacement on any internal combustion engines. Such EGR systems may include one or more EGR conduits and one or more EGR valves that recirculate filtered or unfiltered exhaust gas back to the engine to be mixed with intake air and fuel for combustion in the engine. While such EGR systems have generally performed adequately for their intended purposes, there remains a need in the art for continuous improvements in engine performance and cleaner engine emissions.

SUMMARY

This section provides a general summary of the disclosure, and is not a comprehensive disclosure of its full scope or all of its features.

In one form, the present disclosure provides a system that may include an engine, an exhaust passage, a carbon dioxide capture system, and a dosing valve. The engine includes a combustion chamber. The exhaust passage receives exhaust gas from the engine. The carbon dioxide capture system receives exhaust gas from the exhaust passage and may include a separation device, a pump and a first tank. The separation device removes carbon dioxide from the exhaust gas. The pump pumps the removed carbon dioxide to the first tank. A second tank may receive and store carbon dioxide from the first tank. The dosing valve may be in fluid communication with and disposed downstream of the second tank. The dosing valve may regulate a flow of carbon dioxide from the second tank to the engine.

In some configurations, the carbon dioxide capture system is in fluid communication with an exhaust aftertreatment system that receives exhaust gas from the engine.

In some configurations, the carbon dioxide capture system receives exhaust gas from the exhaust aftertreatment system.

In some configurations, the exhaust aftertreatment system includes one or more of an oxidation catalyst, a particulate filter and a $NO_x$ catalyst.

In some configurations, a turbocharger is disposed upstream of the exhaust aftertreatment system.

In some configurations, all of the exhaust gas produced by the engine flows through the turbocharger.

In some configurations, the system includes a check valve in fluid communication with and disposed between the first and second tanks.

In some configurations, the engine includes at least another combustion chamber and an intake manifold having passages fluidly coupling the intake manifold to each of the combustion chambers. The dosing valve may be disposed upstream of the passages.

In some configurations, the system includes at least another dosing valve in fluid communication with and disposed downstream of the second tank. The engine may include at least another combustion chamber and an intake manifold having passages fluidly coupling the intake manifold to each of the combustion chambers. Each dosing valve may control fluid flow from the second tank to a corresponding one of the passages.

In some configurations, the combustion chamber includes an intake port and a carbon dioxide dosing port. Air enters the combustion chamber through the intake port. The dosing valve may control a flow of carbon dioxide into the combustion chamber through the dosing port.

In another form, the present disclosure provides a system that may include an engine, an exhaust aftertreatment system, a carbon dioxide capture system, and a dosing valve. The engine includes a combustion chamber. The exhaust aftertreatment system receives exhaust gas discharged from the engine. The carbon dioxide capture system may be in fluid communication with the exhaust aftertreatment system and may include a separation device, a pump and a tank. The separation device may remove carbon dioxide from the exhaust gas. The pump may pump the removed carbon dioxide to the tank. The dosing valve may be in fluid communication with and disposed downstream of the tank. The dosing valve may regulate a flow of carbon dioxide from the tank to the engine.

In some configurations, the carbon dioxide capture system receives exhaust gas from the exhaust aftertreatment system.

In some configurations, the exhaust aftertreatment system includes one or more of an oxidation catalyst, a particulate filter and a $NO_x$ catalyst.

In some configurations, a turbocharger is disposed upstream of the exhaust aftertreatment system.

In some configurations, all of the exhaust gas produced by the engine flows through the turbocharger.

In some configurations, the system includes another tank disposed downstream of the pump and upstream of the dosing valve.

In some configurations, the system includes a check valve in fluid communication with and disposed between the tanks.

In some configurations, the engine includes at least another combustion chamber and an intake manifold having passages fluidly coupling the intake manifold to each of the combustion chambers, and wherein the dosing valve is disposed upstream of the passages.

In some configurations, the system includes at least another dosing valve in fluid communication with and disposed downstream of the tank. The engine may include at least another combustion chamber and an intake manifold having passages fluidly coupling the intake manifold to each of the combustion chambers. Each dosing valve may control fluid flow from the tank to a corresponding one of the passages.

In some configurations, the combustion chamber includes an intake port and a carbon dioxide dosing port. Air enters the combustion chamber through the intake port. The dosing valve may control a flow of carbon dioxide into the combustion chamber through the dosing port.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
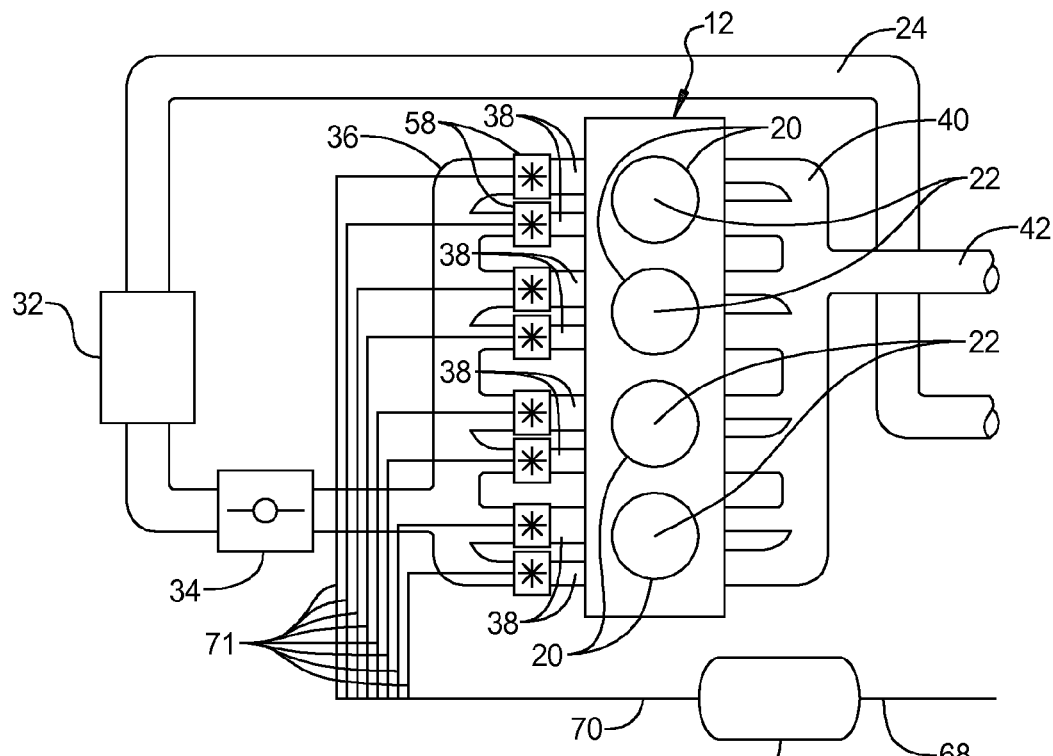
Figure 3:
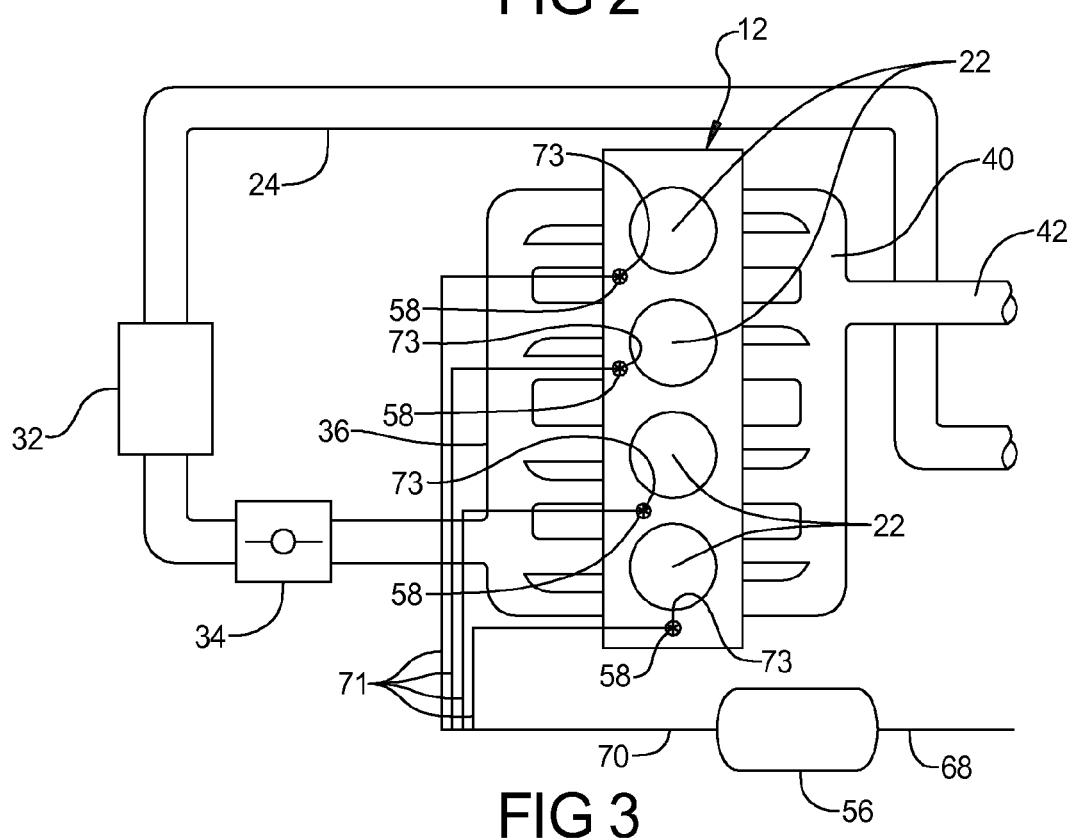

FIG. 1 is a schematic representation of a system including a carbon dioxide recirculation system for an engine according to the principles of the present disclosure;

FIG. 2 is a schematic representation of a portion of another carbon dioxide recirculation system having a dosing valve corresponding to each of a plurality of intake ports according to the principles of the present disclosure; and FIG. 3 is a schematic representation of a portion of yet another carbon dioxide recirculation system having a dosing valve controlling fluid flow through a carbon dioxide port of an engine according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a system 10 is provided and may include an engine 12, an intake system 14, an exhaust aftertreatment system 16, and a carbon dioxide recirculation system 18. The engine 12 can be a combustion engine such as, for example, an internal combustion engine including a plurality of cylinders 20 and a plurality of pistons (not specifically shown) that reciprocate within the cylinders 20 and define a plurality of combustion chambers 22. In some configurations, the engine 12 may include only a single cylinder 20 piston forming a single combustion chamber 22. It will be appreciated that the engine 12 could be any other type of combustion engine such as a Wankel engine, for example.

The combustion chambers 22 may receive air and fuel from the intake system 14 and carbon dioxide from the carbon dioxide recirculation system 18. The intake system 14 may include an intake passage 24 having an air inlet 26, a mass air flow (MAF) sensor 27, a compressor 28 of turbocharger 30, an intercooler 32, and a throttle valve 34. Ambient air may enter the intake passage 24 through the air inlet 26. The compressor 28 may compress the air and pump the air through the intercooler 32 (where heat is removed from the air) and toward the throttle valve 34. The throttle valve 34 can open and close to regulate fluid flow into an intake manifold 36. The intake manifold 36 can include one or more intake ports 38 that provide air or a mixture of air, fuel and/or carbon dioxide to a corresponding one of the combustion chambers 22.

After combustion of the air, fuel and carbon dioxide in the combustion chambers 22, exhaust gas may be discharged from the combustion chambers 22 to an exhaust manifold 40. From the exhaust manifold 40, the exhaust gas may flow into an exhaust passage 42, which may include a turbine 44 of turbocharger 30 and is in fluid communication with the exhaust aftertreatment system 16. The flow of exhaust gas through the turbine 44 drives the turbine 44, which in turn drives the compressor 28. It will be appreciated that the system 10 could include multiple turbochargers 30, a supercharger (not shown) instead of the turbocharger, or the engine 12 could be naturally aspirated (e.g., no turbocharger or supercharger).

The exhaust aftertreatment system 16 may be disposed downstream of the turbine 44 and can include an oxidation catalyst 46, a particulate filter 48 and a $NO_x$ catalyst 50, for example. It will be appreciated that the exhaust aftertreatment system 16 could include additional or alternative components such as one or more urea injectors, one or more hydrocarbon injectors, one or more selective catalytic reduction (SCR) catalysts, a regeneration burner, and/or a three-way catalyst (TWC), for example.

The carbon dioxide recirculation system 18 may be disposed downstream of the exhaust aftertreatment system 16 and may include a $CO_2$ capture system 52, a check valve 54, a storage tank 56, and a $CO_2$ dosing valve 58. The $CO_2$ capture system 52 may include a heat exchanger or cooler 59, a separation device 60, a pump 62 and a primary tank 64. The cooler 59 may cool the exhaust gas prior to entering the separation device 60. The separation device 60 can include any suitable absorption or adsorption device operable to separate carbon dioxide from a stream of exhaust gas received from the exhaust aftertreatment system 16. One method of carbon dioxide separation involves using an absorption device with a liquid medium (such as Amine) into which exhaust gases are passed, and the carbon dioxide selectively dissolves. Then, the carbon dioxide is removed from the solution by heating the solution to release the carbon dioxide gas for capture and storage. The carbon dioxide separated from the exhaust stream may be pressurized and forced into the primary tank 64 by the pump 62. After flowing through the separation device 60, the remaining exhaust gas may flow through an exhaust pipe 66 to any additional exhaust system components (not shown) before being discharged to the ambient environment.

The separated carbon dioxide in the primary tank 64 may flow through a first conduit 68 toward the storage tank 56. The check valve 54 may be disposed along the first conduit 68 between the primary tank 64 and the storage tank 56 and allows fluid flow from the primary tank 64 to the storage tank 56 while restricting or preventing fluid flow in the opposite direction. From the storage tank 56, carbon dioxide may flow through a second conduit 70 to the intake system 14. In some configurations, a junction 72 between the second conduit 70 and the intake system 14 may be disposed at the intake manifold 36 or at a position between an inlet of the intake manifold 36 and the throttle valve 34, for example.

The $CO_2$ dosing valve 58 may be disposed along the second conduit 70 between the storage tank 56 and the junction 72. The $CO_2$ dosing valve 58 may be opened and closed to regulate a flow of carbon dioxide from the carbon dioxide recirculation system 18 to the intake system 14 and combustion chambers 22. In some configurations, upon entering the intake system 14, the carbon dioxide may mix with intake air prior to entering the combustion chambers 22. In some configurations, the $CO_2$ dosing valve 58 may be a solenoid valve, for example. In some configurations, a control module may pulse-width modulate or otherwise control the $CO_2$ dosing valve 58 to control the flow of carbon dioxide therethrough based on engine operating conditions (e.g., engine speed, engine load, throttle valve position, exhaust temperature, engine temperature, $NO_x$ concentrations in the exhaust gas, $CO_2$ concentrations in the exhaust gas, etc.).

In some configurations, the storage tank 56 may have a smaller volume than the primary tank 64. The use of the primary tank 64 in conjunction with the storage tank 56 may allow for the fluid pressure within the storage tank 56 to be maintained at or near a relatively constant level. Under certain operating conditions, fluid pressures within the primary tank 64 can vary depending on the volume of carbon dioxide gas within the primary tank 64. Therefore, providing the storage tank 56 downstream of the primary tank 64 can provide a relatively constant-pressure source from which carbon dioxide can be provided to the engine 12. It will be appreciated, however, that in some configurations, the carbon dioxide recirculation system 18 could include only a single tank (i.e., either the primary tank 64 or the storage tank 56).

As described above, in some configurations, the $CO_2$ capture system 52 is located downstream of exhaust aftertreatment system 16 and turbocharger 30 such that the exhaust gas flows through the separation device 60 after the exhaust gas has flowed through the turbine 44 and the exhaust aftertreatment system 16. Such a configuration may be advantageous in that exhaust gas temperatures may remain relatively high while the exhaust gas is flowing through the turbine 44 and the exhaust aftertreatment system 16. Higher exhaust temperatures at the turbine 44 can increase the amount of work done on the turbine 44. Some components of the exhaust aftertreatment system 16 may function more effectively if the exhaust gas flowing therethrough is at a higher temperature. Furthermore, locating the $CO_2$ capture system 52 allows the exhaust gas to cool prior to reaching the separation device 60, which results in the carbon dioxide recirculation system 18 providing cooler carbon dioxide to the engine 12. Furthermore, locating the $CO_2$ capture system 52 downstream of the turbine 44 may reduce or eliminate any impact on the performance of the turbocharger 30. It will be appreciated, however, that in some configurations, the $CO_2$ capture system 52 could be disposed upstream of the turbine 44 and/or the exhaust aftertreatment system 16 or disposed in a parallel flow path. In some embodiments, a heat exchanger or gas cooler (not shown) could be provided along the first conduit 68 or the second conduit 70 to further cool the carbon dioxide prior to induction into the engine 12, although such a heat exchanger or gas cooler may not be necessary.

With reference to FIG. 2, an alternate configuration of the carbon dioxide recirculation system 18 is provided. Unlike the configuration shown in FIG. 1, the configuration of the carbon dioxide recirculation system 18 shown in FIG. 2 includes a plurality of $CO_2$ dosing valves 58—each $CO_2$ dosing valve 58 corresponding to one of the plurality of intake ports 38 of the plurality of cylinders 20—rather than the single $CO_2$ dosing valve 58 of the configuration shown in FIG. 1. In the configuration of the carbon dioxide recirculation system 18 shown in FIG. 2, the second conduit 70 branches off into a plurality of passages 71. Each passage 71 provides carbon dioxide from the storage tank 56 directly to a corresponding one of the intake ports 38. Each of the $CO_2$ dosing valves 58 can individually control a flow of carbon dioxide into the corresponding intake ports 38. In this manner, a control module controlling operation of the $CO_2$ dosing valves 58 can customize and adjust the amount of carbon dioxide that is provided to each combustion chamber 22 based on combustion strategies and/or control strategies of the engine 12. The amount of amount of carbon dioxide that is provided to one combustion chamber 22 can be the same or different than the amount of carbon dioxide that is provided to one or more other combustion chambers 22.

With reference to FIG. 3, yet another alternate configuration of the carbon dioxide recirculation system 18 is provided and includes a plurality of $CO_2$ dosing valves 58—each $CO_2$ dosing valve 58 corresponding to one of the plurality of cylinders 20. Like the configuration shown in FIG. 2, the configuration of the carbon dioxide recirculation system 18 shown in FIG. 3 includes a plurality of passages 71 branching off of the second conduit 70. Each passage 71 provides carbon dioxide from the storage tank 56 directly to a corresponding one of the combustion chambers 22 via a direct-injection port 73 that extends through to the combustion chamber 22. Each passage 71 can include its own $CO_2$ dosing valve 58 that controls a flow of carbon dioxide through the corresponding direct-injection port 73. Like the configuration of FIG. 2, a control module controlling operation of the $CO_2$ dosing valves 58 of FIG. 3 can customize and adjust the amount of carbon dioxide that is provided to each combustion chamber 22 based on combustion strategies and/or control strategies of the engine 12.

Use of any of the configurations of the carbon dioxide recirculation system 18 described above provides several benefits. For example, introducing carbon dioxide from the recirculation system 18 to the combustion chambers 22 provides a diluent that reduces $NO_x$ levels in the exhaust gas produced by the engine 12. The carbon dioxide recirculation system 18 can be a replacement for conventional EGR systems (e.g., both low-pressure EGR and high-pressure EGR systems). That is, conventional EGR systems can be eliminated from engine systems incorporating the carbon dioxide recirculation system 18.

Furthermore, the carbon dioxide recirculation system 18 may be simpler and less costly than conventional EGR systems, thereby reducing the overall complexity and cost of the system 10. The carbon dioxide recirculation system 18 may also be cleaner than conventional EGR systems and may not have the EGR cooler fouling problems associated with conventional EGR systems. Furthermore, the carbon dioxide recirculation system 18 may allow for higher recirculation flow rates than conventional EGR systems. The response time of the carbon dioxide recirculation system 18 may be higher than conventional EGR systems. Control strategies for the dosing valve 58 may be simpler than conventional EGR valve control strategies. Furthermore, the gas that the carbon dioxide recirculation system 18 recirculates back the engine 12 may have little or no sulfur content or OH promoting species (e.g., $C_2H_2$, NO, etc.), which can improve the auto-ignition process, improve knock resistance, and could potentially advance spark for better fuel efficiency.

In this application, the term "module" may be replaced with the term "circuit." The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; memory circuit (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart elements and descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
an engine including a combustion chamber;
an exhaust passage receiving exhaust gas from the engine;
a carbon dioxide capture system receiving exhaust gas from the exhaust passage and including a separation device, a pump and a first tank, the separation device removing carbon dioxide from the exhaust gas, the pump pumping the removed carbon dioxide to the first tank;
a second tank receiving and storing carbon dioxide from the first tank; and
a dosing valve in fluid communication with and disposed downstream of the second tank, the dosing valve regulating a flow of carbon dioxide from the second tank to the engine.

2. The system of claim 1, wherein the carbon dioxide capture system is in fluid communication with an exhaust aftertreatment system that receives exhaust gas from the engine.

3. The system of claim 2, wherein the carbon dioxide capture system receives exhaust gas from the exhaust aftertreatment system.

4. The system of claim 3, wherein the exhaust aftertreatment system includes one or more of an oxidation catalyst, a particulate filter and a $NO_x$ catalyst.

5. The system of claim 3, wherein a turbocharger is disposed upstream of the exhaust aftertreatment system.

6. The system of claim 5, wherein all of the exhaust gas produced by the engine flows through the turbocharger.

7. The system of claim 1, further comprising a check valve in fluid communication with and disposed between the first and second tanks.

8. The system of claim 1, wherein the engine includes at least another combustion chamber and an intake manifold having passages fluidly coupling the intake manifold to each of the combustion chambers, and wherein the dosing valve is disposed upstream of the passages.

9. The system of claim 1, further comprising at least another dosing valve in fluid communication with and disposed downstream of the second tank, wherein the engine includes at least another combustion chamber and an intake manifold having passages fluidly coupling the intake manifold to each of the combustion chambers, and wherein each dosing valve controls fluid flow from the second tank to a corresponding one of the passages.

10. The system of claim 1, wherein the combustion chamber includes an intake port and a carbon dioxide dosing port, wherein air enters the combustion chamber through the intake port, and wherein the dosing valve controls a flow of carbon dioxide into the combustion chamber through the carbon dioxide dosing port.

* * * * *